United States Patent [19]
Dean

[11] 3,783,720
[45] Jan. 8, 1974

[54] STOP GAUGES WITH HANDLE MOUNTED INDICATOR AND LOCKOUT MEANS

[76] Inventor: Harrison Martin Dean, 205 N. 31st Ave., Yakima, Wash. 98902

[22] Filed: Sept. 2, 1971

[21] Appl. No.: 177,249

[52] U.S. Cl. .................................. 82/34 A, 82/34 B
[51] Int. Cl. ........................................... B23b 25/06
[58] Field of Search .......................... 82/34 A, 34 B

[56] References Cited
UNITED STATES PATENTS

| | | | |
|---|---|---|---|
| 3,477,321 | 11/1969 | Wise | 82/34 A |
| 2,797,488 | 7/1957 | Willrich et al. | 82/34 A X |

*Primary Examiner*—Leonidas Vlachos
*Attorney*—Christensen, O'Connor, Garrison & Hanelka

[57] ABSTRACT

A stop gauge attachment for lathes, milling machines, drill presses and the like, for accurately measuring critical finishing advances of a cutting tool as the tool carriage is tightened against a stop. The device is generally applicable to machines having a tool carriage and drive means for moving the carriage toward a work piece held in the machine, where relative movement between the work piece and tool is terminated by impact of a stop screw or the like on the tool carriage with a stationary stop on the machine, to measure minute amounts of advancement of the tool after the initial impact shuts down the machine drive. Embodiments disclosed include indicators for the bar stop, the ram carriage and the cross feed carriage of a lathe. A dial indicator is included in the knob of the handle used for gripping the device for adjustment purposes. Lockout means are disclosed for rendering the indicator inoperative so as to serve simply as a stop mechanism and provide a reference point from which measurements are made.

11 Claims, 10 Drawing Figures

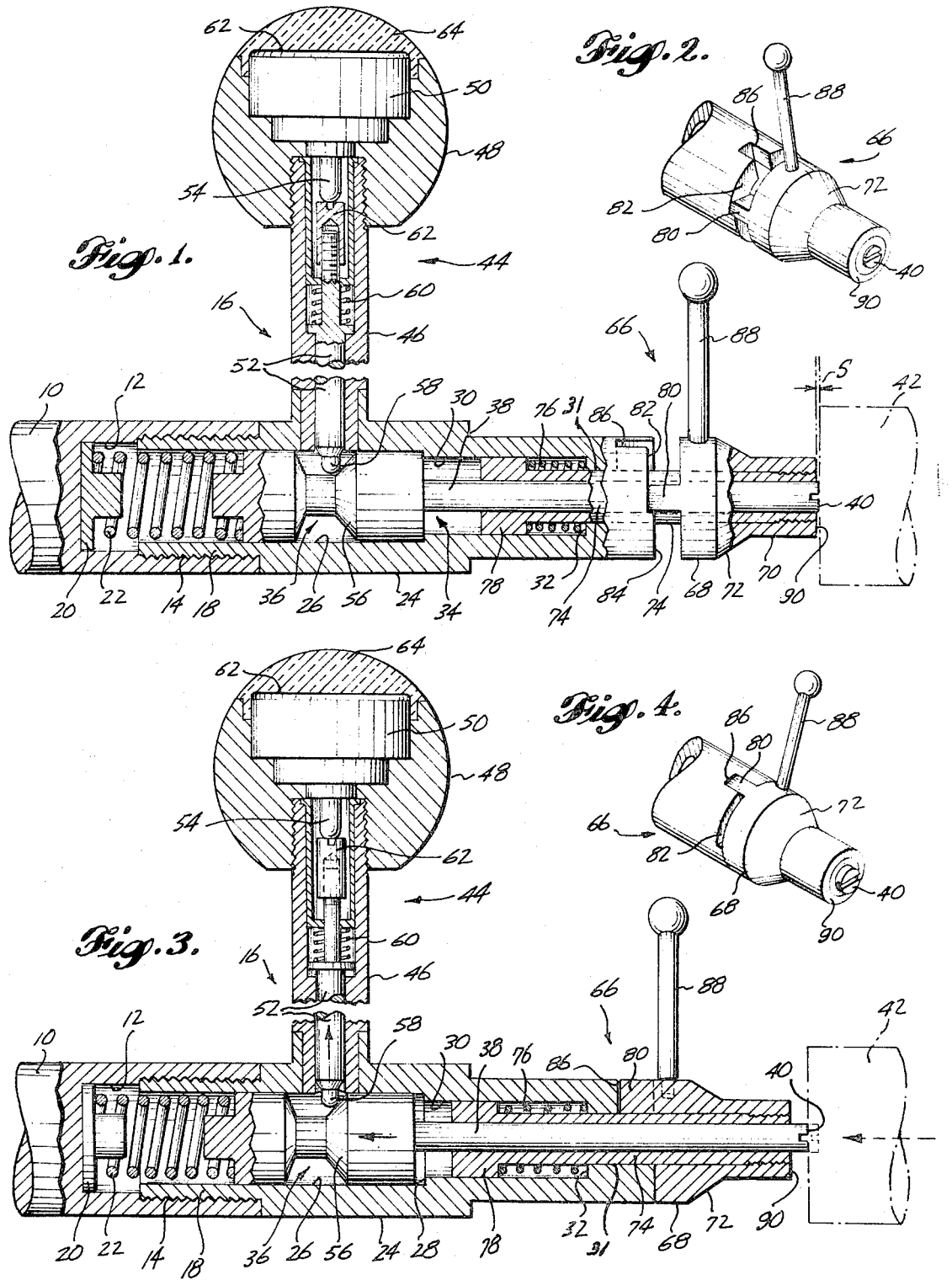

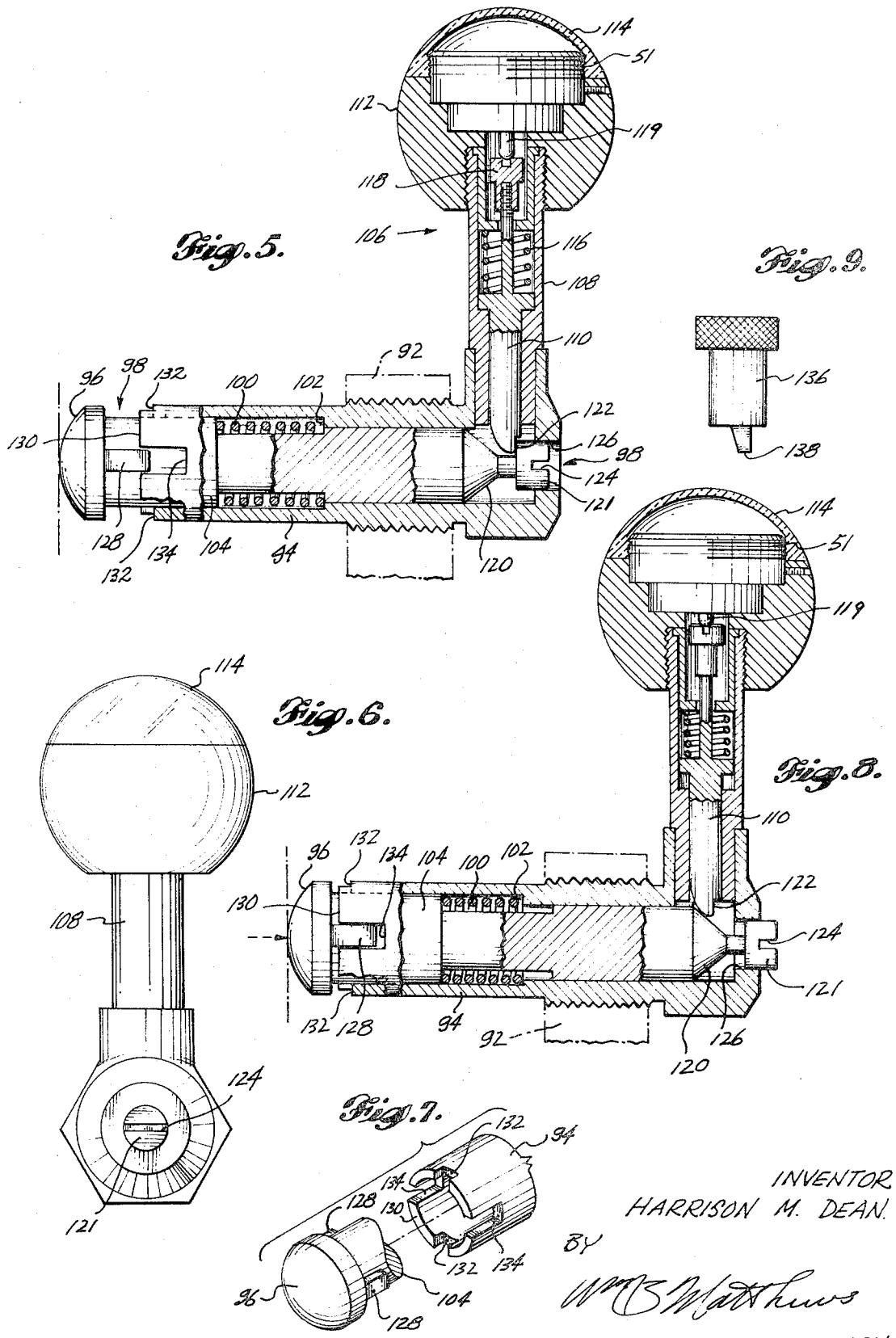

INVENTOR
HARRISON M. DEAN
BY
ATTORNEY

STOP GAUGES WITH HANDLE MOUNTED INDICATOR AND LOCKOUT MEANS

BACKGROUND AND SUMMARY OF THE INVENTION

The problem to which the invention is directed is the accuracy with which a machine tool is advanced to the terminal point of a cut on the work piece held in the machine. The operator of a lathe, for example, generally advances a tool held in the main tool carriage alongside or up to the work piece to a position where the right-to-left motion is intended to end. He positions a stop screw on the tool carriage against a bar stop mounted on a stationary portion of the machine at a contact point corresponding to the intended terminal point of the cut. Thereafter, on each machining pass the carriage is driven until the stop screw on the tool carriage impacts against the bar stop, which causes a clutch in the drive assembly to be tripped, shutting down the drive and stopping the carriage. The same principle generally applies to the advance of the turret unit on a turret lathe, which is carried toward the work piece by a ram saddle unit also having a machine controlled drive. Similarly, a cross feed advance drive on the main carriage unit itself provides for cutting tool motion radially of the work piece, and the invention is applicable for stopping advance of the cross feed unit as well.

In order to avoid overcutting, the operator typically sets the stop at a position which will terminate advance of the tool at a point just short of the intended terminal point of the cut, perhaps within a few hundred thousandths of an inch. The remaining distance through which the tool must be advanced is usually traversed manually by turning a manual advance crank on the main carriage unit, for example, to literally squeeze the stop screw on the carriage against the bar stop on the machine.

The accuracy of the cut depends entirely upon the skill of the operator in estimating by feel the exact distance through which the tool can be advanced by this manual technique performed after the stops are in initial contact. Thus it can be seen that the accuracy of the entire lathe machining operation depends heavily upon the skill of the operator. Of course, if the tool is advanced too far, a work piece worth hundreds of dollars or more may be wasted.

The principle object of this invention is to overcome the problem of such heavy reliance upon the skill of the operator at the most critical point in operation of the machine.

Another object of the invention is to provide a stop gauge indicator without adding an additional element of structure to clutter an already complicated machine. This purpose is served by incorporating the indicator in a handle which is otherwise necessary as a part of the machine.

Still another object of the invention is to provide stop gauge devices having a common principle and common structural features applicable to the main tool advance assemblies of the machine so as to improve the overall accuracy of the basic machining operations. A related object is to provide devices for the aforementioned purpose all operated in the same way so that the operator can apply the same principles learned in one machining operation to all other basic machining operations as well.

An additional object is to provide a simplified stop gauge device which is less expensive to manufacture and yet provides more reliability and accuracy over the life of the machine. A related object is to provide a series of similar attachments for installation as retro-fit units on existing machines with minimum modification therein.

Still another important object is to provide stop gauge devices having a lockout feature which disables the indicator and permits the operator to utilize the device as a stop element as though the indicator were not included. A related object is to provide such a lockout device which establishes an index or reference contact point when set in a primary or lockout position, and is shiftable to permit the stop gauge indicator to measure tool advance from the reference contact point automatically.

The known device most similar to the invention is that disclosed in U.S. Pat. No. 3,477,321, issued to A. C. Wise, Nov. 11, 1969. The stop gauge disclosed therein is adapted for mounting on the bar stop of a lathe type machine. A member slideably mounted in the body portion of the device has an angled surface engaging an angled lift block shaped to move radially of the device. The probe of the radially mounted indicator bears against the lift block and responds to radial movement thereof caused by axial movement of the contact member.

The present invention provides certain improvements over the Wise stop gauge, including elimination of the lift block, placement of the indicator in the handle of the device, and a rearrangement of parts for purposes of simplification and to permit installation of a lockout device in certain embodiments, as will be seen.

As previously indicated, this invention is adapted for use with machines having a first supporting means for holding a work piece, a second support means for holding a cutting tool, and drive means for providing relative movement therebetween. Devices constructed in accordance with the invention are generally intended to replace one of the stop elements normally utilized in the machine to terminate the relative movement between the cutting tool and the work piece.

In its broadest sense the invention comprises a body having an axial opening therein and adapted for mounting in a stationary position with respect to one of the support means in the machine. A contact member mounted for axial movement within the body opening includes a contact end engageable by impact means moved by the other support means and a surface within the body opening positioned at an angle with respect to the body axis. Bias means mounted in the body urge the contact member toward the impact means, and detent means are included in the body against which the contact member is normally held by the bias means and away from which the contact member is moved by the impact means. A radially mounted indicator includes an actuator pintle which directly engages the angled surface to respond accurately to axial movement of the contact member.

The invention contemplates embodiments which are adapted for installation on the main tool carriage portions of the machine, including the main carriage unit, the cross feed carriage unit and the ram saddle unit of a machining lathe, for example.

In preferred embodiments a radially mounted shaft encloses the actuator pintle of the indicator, and a gripping knob mounted on the end of the shaft also forms a handle for gripping the stop gauge device. The knob includes an indicator face therein, and a transparent lens portion through which the face is visible forms an integral part of the handle knob. The handle itself is already a necessary portion of the machine. For example, the bar stop of a machining lathe not equipped with the invention includes a handle for shifting the bar stop to different basic locations corresponding to stop positions between which further adjustments are made by adjusting the stop screws on a stop screw spool mounted on the tool carriage. Since the bar stop handle is already required, the handle mounted indicator of the invention adds no additional structure with which the operator must cope in an already complicated machine.

The invention also resides in the aforementioned lockout device, the disclosed embodiments of which are particularly adapted for installation as a portion of the bar stop assembly or the ram saddle unit assembly of a lathe. The lockout means comprises a stop member mounted on the main body portion of the device and engageable by impact, such as by a stop screw, to terminate the relative movement, along with means for positioning the stop member in primary and secondary positions spaced axially of the body to permit different amounts of relative movement. In its primary position the stop member establishes a reference or index point from which measurements are made by the indicator during additional relative movement after the stop member is shifted to its secondary position. The stop member is rotatable circumferentially of the device, as well as movable axially to shift the same between the primary and secondary positions. While in the carriage unit embodiment the stop member is separate from the contact member and movement of the latter is referenced to and measured from the primary position of the stop member, in the ram unit embodiment the stop member comprises an integral portion of the contact member itself.

In the cross feed embodiment of the invention the contact member includes two contact ends protruding from opposite ends of the body for engagement by impact means from either direction, and further includes two angled surfaces converging centrally of the contact member. The actuator pintle of the indicator is mounted centrally of the contact member for engaging either angled surface to respond to axial movement in either direction, and the bias member includes a spring mounted in each end of the body to engage the contact member and urge the same toward the opposite end, with means for adjusting the compression in the springs in order to center the contact member with respect to the actuator pintle of the indicator.

These and other features, objects and advantages of the invention will be more fully understood from the following detailed description of preferred embodiments, taken in conjunction with the accompanying drawings.

BRIEF DESCRIPTION OF THE DRAWINGS

FIG. 1 is a partially sectioned, side elevation view of one embodiment of the invention showing the handle mounted indicator and the lockout device in its index position.

FIG. 2 is an isometric view of the lockout portion of the device shown in FIG. 1.

FIG. 3 is a partially sectioned side elevation view of the device shown in FIG. 1, with the lockout device shifted to its secondary position.

FIG. 4 is an isometric view of the lockout device of FIGS. 1 and 3, shifted to its secondary position.

FIG. 5 is a partially sectioned side elevation view of the second embodiment of the invention showing the contact member in its rest position before impact.

FIG. 6 is an end view taken from the right-hand end of the device shown in FIG. 5.

FIG. 7 is an exploded isometric view of the end portion of the device shown in FIG. 5.

FIG. 8 is a partially sectioned side elevation view of the device shown in FIG. 5, with the contact member shifted to the right, following impact.

FIG. 9 is a side elevation view of a replacement plug adapted to fit into the device shown in FIGS. 5 and 8 when the handle mounted indicator and shaft are removed.

DETAILED DESCRIPTION OF PREFERRED EMBODIMENTS

Figure 10:
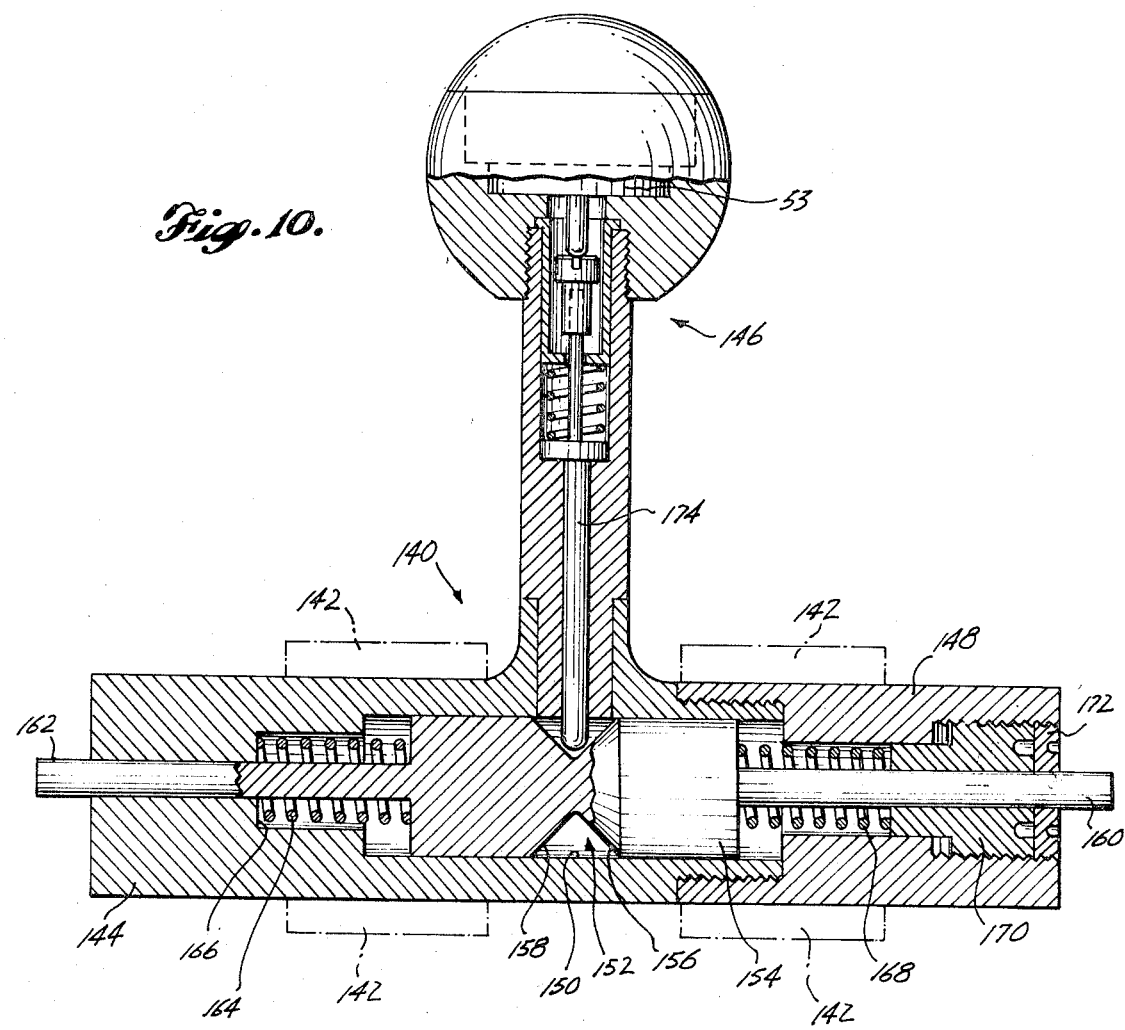
FIG. 10 is a partially sectioned side elevation view of a third embodiment of the invention adapted to measure relative motion in either direction.

The three basic assemblies of a machining lathe for which the three disclosed embodiments of the invention are adapted, are well known to those skilled in the art. To provide a context for discussing the operation of the disclosed embodiments, the important features of such lathe assemblies will be discussed briefly herein, although not illustrated in the drawings.

A turret lathe includes a head stock unit located at the left end of the machine, carrying a chuck in which the work piece is held and rotated by a motor mounted within the machine and connected through adjustable gears to turn the chuck at different speeds. A tool carriage unit is mounted on parallel tracks aligned parallel to the chuck axis and drive means propels the carriage toward and away from the chuck and work piece under controls adjustable by the operator to make cuts of different depths and shapes and at different speeds. Mounted on a bracket on the front of the head stock unit is a longitudinal bar stop having a lever arm for rotating the bar stop and sliding it lengthwise to different positions after loosening a bracket lever. A standard bar stop includes a shank having spaced cross cuts adapted to be keyed in the holding bracket to position the bar stop in different basic locations. Into the end of the bar stop is normally threaded a stop stud and a lock nut providing some adjustment to position the lock nut in relation to the cross cuts.

Mounted on the main carriage unit of the lathe is a stop spool having a number of longitudinal stop screws threaded therein at different depths, each being positionable by rotation of the spool to impact against the bar stop stud. The stop screws may be adjusted to different depths to establish different distances of travel of the carriage unit toward the head stock for different cuts on a single work piece and are rotated into position for each cut, this procedure being repeated for a series of work pieces intended to be identical.

The main drive assembly in a lathe is arranged so that when the stop screw impacts against the bar stop stud, a clutch immediately releases the drive and the carriage unit stops. Thereafter, the operator advances the carriage further, to more accurately define the end of the cut, by turning a carriage advance crank to literally squeeze the longitudinal stop screw on the carriage unit against the bar stop stud. As noted earlier, the accuracy of the cut depends entirely upon the operator's skill in estimating by feel the exact distance through which the tool can be advanced by this manual technique.

As in the case of the device shown in the aforementioned Wise patent, the FIG. 1 embodiment of this invention is adapted for installation in the end of a bar stop 10, the end of which appears in FIGS. 1 and 3. If the end of the bar stop does not already include a threaded cavity to receive the stop gauge in accordance with the invention, it can be easily modified by machining a cavity 12, having an internally threaded portion 14 therein. The stop gauge device 16 includes a step-down, externally threaded end portion 18 which may be either open or closed prior to installation in the bar stop 10. As shown, the end 18 is open and a separate bushing 20 is installed in the bar stop cavity 12 to receive a return spring 22. The body 24 of the stop gauge includes a full-length axial opening 26 having a constant internal diameter from the end portion 18 to an internal annular shoulder 28 (FIG. 3), and reduced internal diameters in the smaller cavity portions 30 and 31, separated by the internal annular end shoulder 32.

Mounted within the axial opening is a contact member 34, which consists of a spool portion 36 and a shank 38 terminating in a contact end 40. The spool portion 36 is slideable within the main cavity portion 26, and the right-hand end thereof is normally held against the shoulder 28 by the return spring 22. When contact end 40 is engaged by an impact member 42, such as a stop screw on the carriage unit, the contact member 34 is moved to the left against the force of spring 22.

Mounted to extend radially from the body portion 24 of the device is a handle and indicator assembly 44 consisting of a shank 46 and a spherical knob 48 enclosing an indicator head 50. An actuator pintle 52 mounted longitudinally within the shaft 46 of the handle extends into the cavity 26 on the lower end and engages a probe 54 of the indicator at the upper end. The contact member spool portion 36 includes a surface 56 which is angled with respect to the axis of the device and is engaged by the rounded lower end 58 of the actuator pintle 52 so that when the contact member is moved to the left the actuator pintle is raised to depress the probe 54 and register the movement on the indicator 50. The actuator pintle is normally held against the angled surface 56 by a return spring 60 in the shank 46 of the handle, which also includes an adjustment screw 62 for calibration purposes.

The indicator face 62 is directed radially of the device and is covered by a lens 64 having a hemispherical surface matching the curvature of the knob surface and forming a part thereof. This places the indicator in a directly readable position immediately in front of the operator of the machine, where the bar stop handle normally is located.

As noted previously, the stop gauge device 16 replaces the stop stud (not shown) usually mounted in the end of the bar stop 10 and against which a stop screw on the tool carriage impacts to cause shut-down of the tool carriage drive. In accordance with the invention a lockout device 66 mounted on the end of the stop gauge is operable in effect to disable the indicator portion of the stop gauge and serve simply as a stop stud, but also to establish a reference point from which measurements are made by the indicator when operative.

The lockout device includes an annular base portion 68 concentrically encircling the shaft 38 of the contact member and having a main diameter equal to that of the stop gauge end on which it is mounted, and a smaller diameter 70 at the end, with a cone shaped portion 72 therebetween. A flanged retainer member 74 also concentrically encircling the contact member extends from the end of the small diameter nose portion 70 of the lockout device, to which it is threadably secured into the cavity of the stop gauge body. A retainer spring 76, mounted within the body between the flanged end 78 of the retainer member 74 and the internal annular shoulder 32 of the body, normally retains the lockout device against the end of the stop gauge.

The base portion 68 includes a pair of keys or lugs 80 (one of which is not visible) located on opposite sides thereof and extending axially toward the stop gauge. The end of the stop gauge body includes a pair of primary shallow slots 82, each extending approximately 90° around the end face 84 of the stop gauge body and terminating in a pair of deeper secondary slots 86.

When the lockout is in its primary position as shown in FIGS. 1 and 2, keys 80 are received in primary slots 82, and when rotated to its secondary position they are received in secondary slots 86 as shown in FIGS. 3 and 4. A handle 88 is provided for gripping and turning the rotatable lockout device to shift it circumferentially and axially between these positions.

When in its primary position the end face 90 of the lockout is spaced back from the contact end 40 of the contact member by a known distance S, which is preferably about 0.002 of an inch. Correspondingly, the indicator 50 mounted in the handle of the stop gauge device registers minus 0.002 inches prior to impact of the stop screw 42 or other impact means with contact end 40. As the contact member is depressed and moved to the left by the impact member 42, the indicator 50 registers zero at the exact instant when contact end 40 is flush with the contact surface 90 of the lockout device just as the carriage drive is shut down.

The operator then retracts the lockout to its secondary position as shown in FIGS. 3 and 4 and proceeds, usually manually to advance the tool carriage farther to the left against the force of return spring 22. The actuator pintle 52 rides up the angled surface 56 of the contact member and the indicator registers the exact distance of travel of the contact member from its reference or zero position. The indicator thus measures accurately the distance travelled from the initial stop point, in thousandths or ten thousandths of an inch. In its retracted, secondary position as shown in FIGS. 3 and 4 the lockout device also serves to protect the stop gauge against overadvance of the tool carriage, since the latter will be halted when the impact member 42 contacts end surface 90 of the stop gauge.

The ram saddle unit of a turret lathe or similar type lathe is mounted on the parallel tracks previously described and is driven toward the chuck to carry the turret or other tool support means toward the work piece. It includes a slide stop spool into which are threaded a number of elongated stop rods, similar to the stop screws on the main tool carriage unit, which engage a stop dog in the base of the unit to stop advance of the turret at a given position. In the past the operator has estimated by feel the critical few thousands of an inch of advance of the tool after initial impact of the stop elements.

In most lathes a knockoff rocker arm is included in the ram saddle unit, which acts as a bell crank to transmit through a 90° turn the force of the ram unit drive. The stop gauge embodiment shown in FIGS. 5 to 9 replaces the sleeve and clutch kick-off pin impacted by the rocker arm in the ram or turret carriage of most ram or saddle type turret lathes. The gauge is mounted in the frame by a suitable bracket 92, into which the body portion 94 is threaded, in a position whereby the rounded end 96 of the longitudinal contact member 98 is engaged by an impact member (not shown) responsive to movement of the ram unit.

In a manner similar to the embodiment first described, the contact member 98 is urged in the direction of the impact member by a return spring 100, which in this case is mounted in the contact end of the device between an internal angular shoulder 102 in the body and the flanged portion 104 of the contact member. The radially mounted handle 106 includes a shaft 108 enclosing an actuator pintle 110 slideably mounted therein, and carries a spherical knob 112 which encloses the indicator 51, the face of which is visible through a spherical lens portion 114 forming a part of the knob surface. In this embodiment the lens 114 is curved on both sides above the indicator face whereas in the embodiment first described the lens is rounded externally and flat internally to provide magnification of the indicator face.

As before, the actuator pintle 110 is normally held in its lower position as shown in FIG. 8 by a return spring 116, and an adjustment screw 118 in contact with the indicator probe 119 permits zero adjustment. The contact member 98 again includes an angled surface 120 which the lower end of the actuator pintle 110 engages. As impact at contact end 96 occurs, the contact member 98 is moved to the right and the actuator pintle 110 rides up the angled surface 120 to register an indication on the face of indicator 51. The depressed or advanced position of the contact member is illustrated in FIG. 8.

In this embodiment the contact member 98 and actuator pintle 110 interlock at the end to hold the contact member within the body 94 against the force of return spring 100, a function performed by different internal features of the first embodiment. The flanged lock element 121 on the right-hand end of contact member 98 is engaged as shown in FIG. 5 by the flat surface 122 of the actuator pintle 110 when the contact member is in its rest position. The lock element 120 includes a screw driver slot 124 accessible through the body opening 126 to rotate the contact member for a purpose to be explained.

A lockout feature permits the operator to disable the indicator portion of the device, just as in the first embodiment. While in that embodiment the lockout device is separate from and adjacent to the end of the contact member, in this embodiment it comprises a portion of the contact member itself, together with features incorporated in the body 94. Specifically, a pair of key elements 128 extending axially along the shaft of the contact member 98 from the enlarged rounded end portion 96 thereof are engageable with either of two pairs of key slots formed in the end 130 of the stop gauge body 94.

The shallower primary slots 132 permit the operator to disable the indicator 51 just as in the first embodiment, except that in this case the handle 108 and actuator pintle 110 must be removed to free the contact member to be rotated 90° from the position shown in FIGS. 5 and 8 to engage the keys 128 with slots 102. Once seated in these slots, with the actuator pintle replaced, the keys prevent the contact member from turning, and the device simply works as a stop stud. Unless the indicator fails to work, or machining requiring little accuracy is being done, it is seldom necessary to thus disable the gauge.

When the contact member is rotated to the position shown in FIGS. 5 and 8 with keys 128 aligned in slots 134, the indicator is operative to measure advances of the ram carriage unit following initial impact of the contact member with a kick-out or clutch release impact member. As the contact member is advanced, actuator pintle 110 contacts the angled surface 120, registering zero on the indicator 51 after a predetermined distance of travel. Thereafter, the indicator registers the exact distance of travel of the tool. If the contact member is advanced too far, the flanged end 96 bottoms against the end face 130 of the body. Thus the contact member serves the same protective function as the lockout device in the embodiment first described, preventing overadvance of the angled surface 120 toward the opening 126 in the body 94.

When it is desired to operate the lathe without the indicator device, the handle mounted indicator 106 may be removed and replaced with a replacement plug 136, shown in FIG. 9. The lug 138 protruding from the bottom of the plug engages the flanged lock element 120 to hold the contact member within the body, thereby replacing the retaining function of the actuator pintle 110.

The main carriage unit of a machining lathe also includes a cross slide unit for moving the tool radially of the work piece. This unit is usually adapted to move toward the center of the work piece from the front of the lathe or away from the center toward the front of the lathe for machining inside the cavity of a work piece. Accurate measurement of movement in either direction is required.

Heretofore, final advances of the tool have been effected manually by the operator, again relying on the "feel" of the unit and visual or manual measurement. This invention provides a double acting stop gauge indicator for use with the cross slide unit of a machining lathe or the like, as shown in FIG. 10.

The unit 140 is mounted on or adjacent to the cross slide unit by a pair of brackets 142. The body of the unit is generally symmetrical, with the left-hand body portion 144 supporting at the center the radially mounted handle and indicator unit 146, which is essentially identical to the handle mounted indicator unit 44 in FIG. 1. The right-hand end portion 148 is threaded onto the left-hand portion 144 to define an internal cavity portion 150 in which is mounted a symmetrical contact member 152. The contact member has a centrally located spool portion 154 which has converging angled surfaces 156 and 158 at the center, and right and left end shafts 160 and 162 extend to the right and left from the spool portion and protrude from the respective ends of the body. The left end return spring 164 mounted between an internal shoulder 166 and the left-hand end of spool portion 154 urges the contact member to the left. A lock sleeve 172 holds the retainer sleeve 170 in position after adjustment of the compression in the springs so that the spool is accurately located in the center where the actuator pintle 174 of the indicator unit engages both angled surfaces 156 and 158.

Since return springs 164 and 168 are in series and are balanced against each other, the indicator registers exactly the same reading for the same amount of advance of the contact member in either direction, even if the springs 164 and 168 are not identical. This is an important feature of the arrangement, since it is virtually impossible to obtain two completely identical springs.

An impact element such as a stop rod or stop screw in the cross slide unit engages either end of the contact member 152 to move the same in either direction, and an accurate measurement is read directly in ten thousandths or one hundred thousandths of an inch on the indicator.

Various modifications and other embodiments within the scope of the principles disclosed herein will be recognized by those skilled in the art.

I claim:

1. A stop gauge device for a machine having first support means for holding a workpiece, second support means for holding a cutting tool, drive means for providing relative movement therebetween, and impact means mounted on each support means and engageable with each other to terminate said relative movement, said device comprising:
   a. a body having an axial opening therein and adapted for mounting in a stationary position on one of said impact means;
   b. a contact member mounted for axial movement within said opening and having a contact end engageable by the other impact means;
   c. bias means mounted in said body to urge the contact member toward said other impact means; and
   d. indicator means mounted on said body including a radially mounted shaft, an actuator pintle within said shaft coupled with said contact member to respond to axial movement thereof, and a gripping knob mounted on the end of said shaft to form a handle for gripping said device, said knob having a transparent portion and an indicator coupled with said pintle and visible through said transparent portion.

2. The device of claim 1 wherein said face is directed radially away from said axis to be viewed from the end of said handle.

3. A stop gauge device for a machine having first support means for holding a workpiece, second support means for holding a cutting tool, drive means for providing relative movement therebetween, and impact means mounted on each support means and engageable with each other to terminate said relative movement, said device comprising:
   a. a body having an axial opening therein and adapted for mounting in a stationary position on one of said impact means;
   b. a contact member mounted for axial movement within said opening and having a contact end engageable by the other impact means;
   c. bias means mounted in said body to urge the contact member toward said other impact means;
   d. indicating means mounted on said body portion and coupled with said contact member for indicating movement thereof with respect to said body portion; and
   e. a stop member mounted on said body portion and means coupled therewith for shifting the same between a primary position, in which it is operable to engage said other impact means and terminate relative movement of the support means at a first location beyond which movement of the contact member is prevented thereby, and a secondary position, in which it permits movement of said contact member beyond said first location and registry of said relative movement on the indicator.

4. The device of claim 3 wherein said stop member and said body include respective cooperable catch elements mounted in primary and secondary locations spaced axially and circumferentially thereof, and wherein said stop member is rotatable about the body axis and shiftable along said axis for selective engagement of the respective catch elements when placed in said primary and secondary positions.

5. The device of claim 4 wherein:
   a. said stop member includes an annular base portion concentrically encircling said contact member and a retainer portion extending into said body;
   b. said body includes a retainer spring engaging said retainer portion to hold the contact member base portion against the end of the body;
   c. said catch elements include an axial slot formed in the end of the body and a corresponding key element formed on the stop member base portion; and
   d. a handle mounted on the base portion to enable gripping and turning the stop member to engage and disengage the key and slot elements when shifting the stop member between said primary and secondary positions.

6. The device of claim 4 wherein said stop member comprises an integral portion of said contact member and said contact surface coincides with said contact end.

7. The device of claim 3 wherein the indicator is indexed to register movement of the contact member relative to said first location corresponding to the primary position of the stop member.

8. A stop gauge device for a machine having first support means for holding a workpiece, second support means for holding a cutting tool, drive means for providing relative movement therebetween, and impact means mounted on each support means and engageable with each other to terminate said relative movement, said device comprising:
   a. a body portion having an axial opening therein and adapted for mounting in a stationary position on one of said impact means;
   b. a contact member mounted for axial movement within said opening and having a contact end engageable by the other impact means, said member further including a surface within said opening positioned intermediate the ends of said contact member and at an angle with respect to the axis thereof;
   c. indicator means mounted on said body including an actuator pintle extending radially of said contact member and cooperable with said angled surface to respond to axial movement thereof; and d. bias means including a spring mounted to engage said contact member at the end opposite said contact end to urge the contact member toward said other impact means.

9. The device of claim 8 wherein:

a. said contact member includes two contact ends protruding from opposite ends of said body for engagement by said other impact means from either axial direction, and two of said angled surfaces converging centrally of said contact member;

b. said actuator pintle is mounted centrally of said contact member for engaging either angled surface to respond to axial movement of the contact member in either direction; and c. said bias means includes a spring mounted in each end of the body and engaging the contact member to urge the same toward the opposite end, and means mounted in one end of the body for adjusting the compression in said springs.

10. The device of claim 9 wherein said indicator comprises a radially mounted shaft enclosing said actuator pintle and a gripping knob mounted on the end of said shaft to form a handle for gripping said device, said knob including an indicator face therein and a transparent portion through which said face is visible.

11. The device of claim 10 wherein said face is directed radially away from said axis to be viewed from the end of said handle.

* * * * *